United States Patent
Fox (10) Patent No.: US 8,920,284 B2
(45) Date of Patent: Dec. 30, 2014

(54) EPICYCLIC GEAR SYSTEM WITH SEMI-INTEGRATED FLEXPIN ASSEMBLIES

(75) Inventor: Gerald P. Fox, Massillon, OH (US)

(73) Assignee: The Timken Company, North Canton, OH (US)

( * ) Notice: Subject to any disclaimer, the term of this patent is extended or adjusted under 35 U.S.C. 154(b) by 524 days.

(21) Appl. No.: 13/265,769

(22) PCT Filed: Apr. 21, 2010

(86) PCT No.: PCT/US2010/031843
§ 371 (c)(1),
(2), (4) Date: Oct. 21, 2011

(87) PCT Pub. No.: WO2010/123964
PCT Pub. Date: Oct. 28, 2010

(65) Prior Publication Data
US 2012/0040797 A1    Feb. 16, 2012

Related U.S. Application Data (60) Provisional application No. 61/171,972, filed on Apr. 23, 2009.

(51) Int. Cl.
| | |
|---|---|
| *F16H 57/08* | (2006.01) |
| *F16H 1/28* | (2006.01) |
| *F16C 19/38* | (2006.01) |
| *F16C 33/60* | (2006.01) |
| *F16C 35/063* | (2006.01) |
| *F16C 43/04* | (2006.01) |

(52) U.S. Cl.
CPC .............. *F16H 1/2836* (2013.01); *F16C 19/38* (2013.01); *F16C 33/60* (2013.01); *F16C 35/063* (2013.01); *F16C 43/04* (2013.01); *F16H 57/082* (2013.01); *F16H 2057/085* (2013.01); *F16C 2361/61* (2013.01)
USPC ............................ 475/348; 475/346; 384/128

(58) Field of Classification Search
USPC ................................... 475/346–348; 384/128
See application file for complete search history.

(56) References Cited

U.S. PATENT DOCUMENTS 1,843,463  A  *  2/1932  Tawresey ..................... 384/559
2,666,676  A  *  1/1954  Rhine ........................... 384/473

(Continued)

FOREIGN PATENT DOCUMENTS

EP            1837535  A1     9/2007
GB         2 413 836  A     11/2005

(Continued)

*Primary Examiner* — Derek D Knight
(74) *Attorney, Agent, or Firm* — Michael Best & Friedrich LLP (57) ABSTRACT

An epicyclic gear system (A) includes a sun gear (2), a ring gear (4) located around the sun gear (2) and planet pinions (6) located between the sun and ring gears (2,4). The planet pinions (6) rotate on a carrier (8) that includes flexpins (20) that are cantilevered from a wall (12) of the carrier (8) and sleeves (22) that are attached to the remote ends of the flexpins (20) and extend back over the flexpins (20) to create a double cantilever. Bearings (24) support the planet pinions (6) on the sleeves (22) so that the planet pinions (6) rotate about the flexpins (20). The double cantilever enables the flexpins (2) to flex such that the axes (Y) of the planet pinions (6) remain parallel to the common axis (X) of the sun and ring gears (2, 4). Each sleeve (22) h an integrated bearing race (44) and a bearing seat (42) that carries a separate bearing race (60). The sleeve (22) is easily detached from its flexpin (20) and the separate race (60) is easily removed from the sleeve (22) to disassemble the bearing (24) and remove the planet pinion (6).

20 Claims, 5 Drawing Sheets

(56) References Cited

U.S. PATENT DOCUMENTS 6,994,651 B2 * 2/2006 Fox et al. ............... 475/335
2007/0211976 A1 * 9/2007 Fox et al. ............... 384/494

FOREIGN PATENT DOCUMENTS

| JP | 1 178220 U | 12/1989 |
| JP | 6010994 | 1/1994 |

* cited by examiner

EPICYCLIC GEAR SYSTEM WITH SEMI-INTEGRATED FLEXPIN ASSEMBLIES

CROSS-REFERENCE TO RELATED APPLICATIONS

This application derives priority from and otherwise claims the benefit of U.S. Provisional Application 61/171972, filed Apr. 23, 2009, and International Application PCT/US2010/031843 filed Apr. 21, 2010, and published under International Publication No. WO 2010/123964, both of which are incorporated herein by reference.

TECHNICAL FIELD

This invention in general relates to epicyclic gear systems and more particularly to epicyclic gear systems in which the planet pinions rotate about flexpins and to flexpin assemblies for such systems.

BACKGROUND ART

The typical epicyclic gear system has a sun gear, a ring gear surrounding the sun gear, and several, often three, planet pinions located between and engaged with the sun and ring gears, and in addition, it has a carrier that is coupled to the planet pinions to establish axes about which they rotate. A gear system so configured splits the torque transferred through the system into load paths equal in number to the number of planet pinions. This reduces the forces at each mesh and enables the system to transfer a large amount of power in a relatively compact configuration. In other words, it provides a high power density.

Often the ring gear remains fixed, leaving the carrier and sun gear to rotate. In such an arrangement, power may be applied at one end of the carrier and delivered through the sun gear at a different velocity and torque. This holds true for the transmissions in wind turbines that harness the energy of the wind and convert it into electrical power.

Many epicyclic gear systems utilize a straddle-type carrier in which the planet pinions rotate between two walls on pins that extend between the walls, each pin being affixed at both of its ends in the walls. When torque is applied to the carrier at one of the end walls, the carrier will twist and advance one end of each pin ahead of the other. This skews the planet pinions with respect to the sun and ring gears and disturbs the mesh between the planet pinions and the sun and ring gears.

An epicyclic gear system in which the planet pinions are supported on and rotate about so-called "flexpins" helps mitigate unequal load distribution around the planet pinions and skewing of the pinions as well. In this regard, a flexpin for a planet pinion at one end is attached to and cantilevered from a single wall of the carrier of which it is a part. The other end of the flexpin has a sleeve fitted firmly to it, with the sleeve extending back over and otherwise being radially spaced from the flexpin. The sleeve forms part of or carries a bearing that supports one of the planet pinions. At the carrier wall the flexpin bends in one direction circumferentially relative the central main axis of the system and at its opposite end bends in the other direction, again circumferentially, all such that the sleeve axis remains parallel to the main axis. In other words, flexpin technology employs a double cantilever to equalize load distribution and to offset the skewing that would otherwise occur.

Each flexpin, its sleeve, sometimes the planet pinion that surrounds the sleeve, and the bearing located between the sleeve and the planet pinion forms a flexpin assembly. Typically, the bearing is a double row antifriction bearing. The outer raceways for the bearing may be integrated into the planet pinion. The inner raceways may be integrated into the sleeve to provide an integrated flexpin assembly. Here, instead of a cross section that includes both the sleeve and separate inner races, the cross section has just the sleeve and is somewhat smaller. However, the bearing has an initially separate rib ring to facilitate assembly. Once assembled, the ring is welded to the sleeve, and its axial position determines the setting for the bearing. See U.S. Pat. Nos. 7,056,259 and 6,994,651. The integrated flexpin affords more space for the rolling elements, so that rolling elements of greater diameter may be employed, and this increases bearing capacity. Also, an integrated flexpin normally operates with a planet pinion that has outer bearing races integrated into it. This increases the radial cross sections between the roots of the teeth on the planet pinion and the outer raceways (greater rim thickness). Moreover, an integrated flexpin has fewer components, thus simplifying the design and making it easier to manufacturer.

The use of the pin with groove, coupled with a welded rib ring on the sleeve to achieve roller retention and bearing adjustment, also results in a very short flexpin assembly, which in some cases can lead to a reduction in gear box length and thus reduce overall weight and cost. See U.S. Pat. No. 6,994,651.

However, a fully integrated flexpin with its welded rib ring is not easily serviced. Indeed, to replace the planet pinion or a component of the bearing, the flexpin of the assembly must be separated from the remainder of the carrier, usually a carrier wall in which the flexpin is secured with an interference fit. The elevations at which wind turbines operate exacerbate the problem.

BRIEF DESCRIPTION OF THE DRAWINGS

In the accompanying drawings which form part of the specification.

BEST MODES FOR CARRYING OUT THE INVENTION

Figure 1:
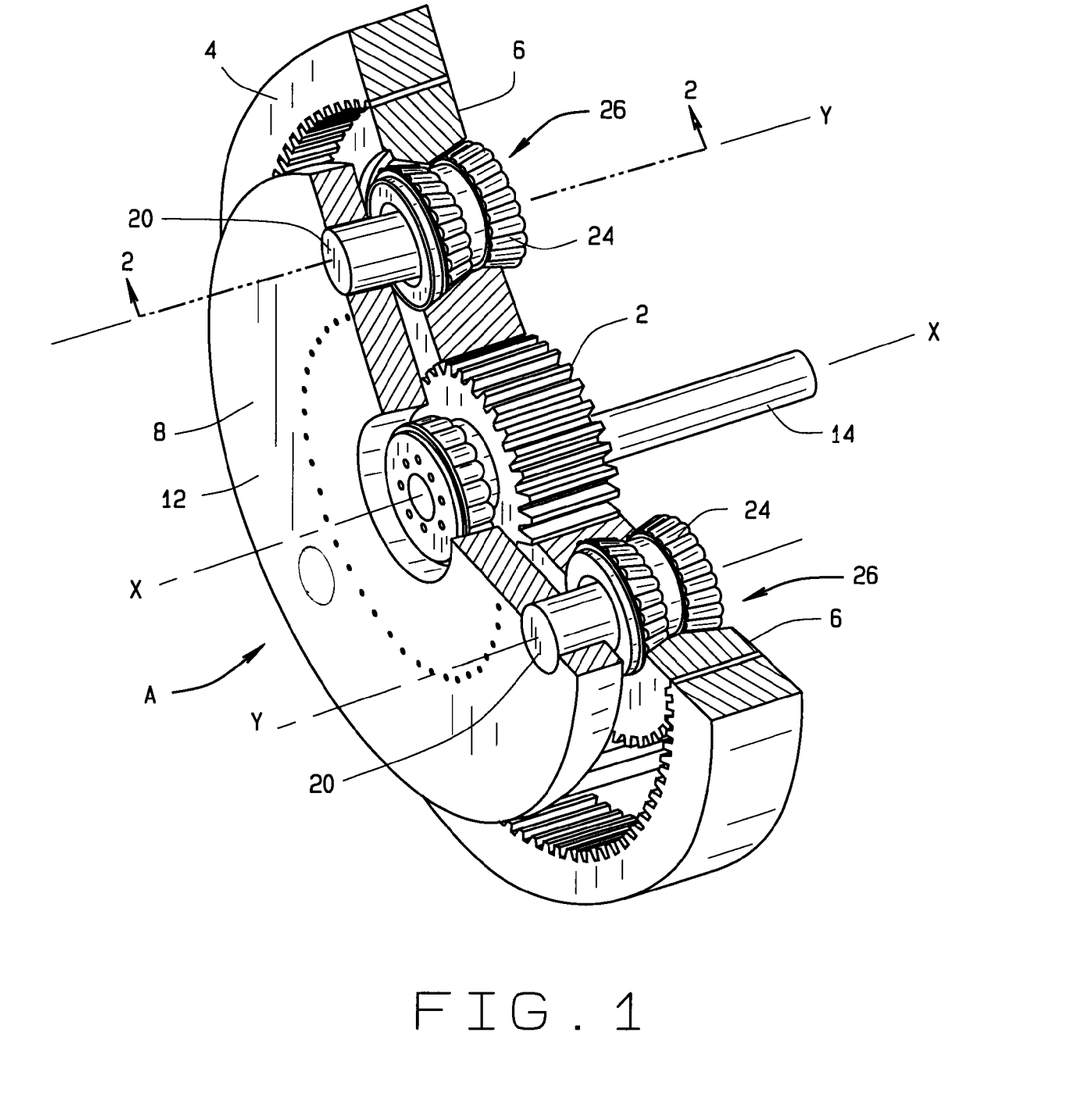
FIG. 1 is a perspective view, partially broken away and in section, of an epicyclic gear system constructed in accordance with and embodying the present invention.

Referring now to the drawings, an epicyclic gear system A (FIG. 1) that is organized about a central axis X includes a sun gear 2, a ring gear 4, and planet pinions 6 located between and engaged with the sun gear 2 and ring gear 4. In addition, the gear system A includes a carrier 8 that establishes offset axes Y about which the planet pinions 6 rotate, and those axes Y should lie parallel to the central axis X. Any one of the sun gear 2 or the ring gear 4 or the carrier 8 may remain fixed against rotation, while the other two rotate, torque being applied to one and delivered from the other. The gear system A that is illustrated, can serve as a speed increaser, in which event torque is applied to the carrier 8 and delivered from the sun gear 2, while the ring gear 4 remains fixed. It is well suited use in a wind turbine between the wind-driven rotor and the electrical generator of the wind turbine. To this end, the carrier 8 has an end member in the form of a wall 12 to which torque is applied, while the sun gear 2 has an output shaft 14 coupled to it.

Figure 3:
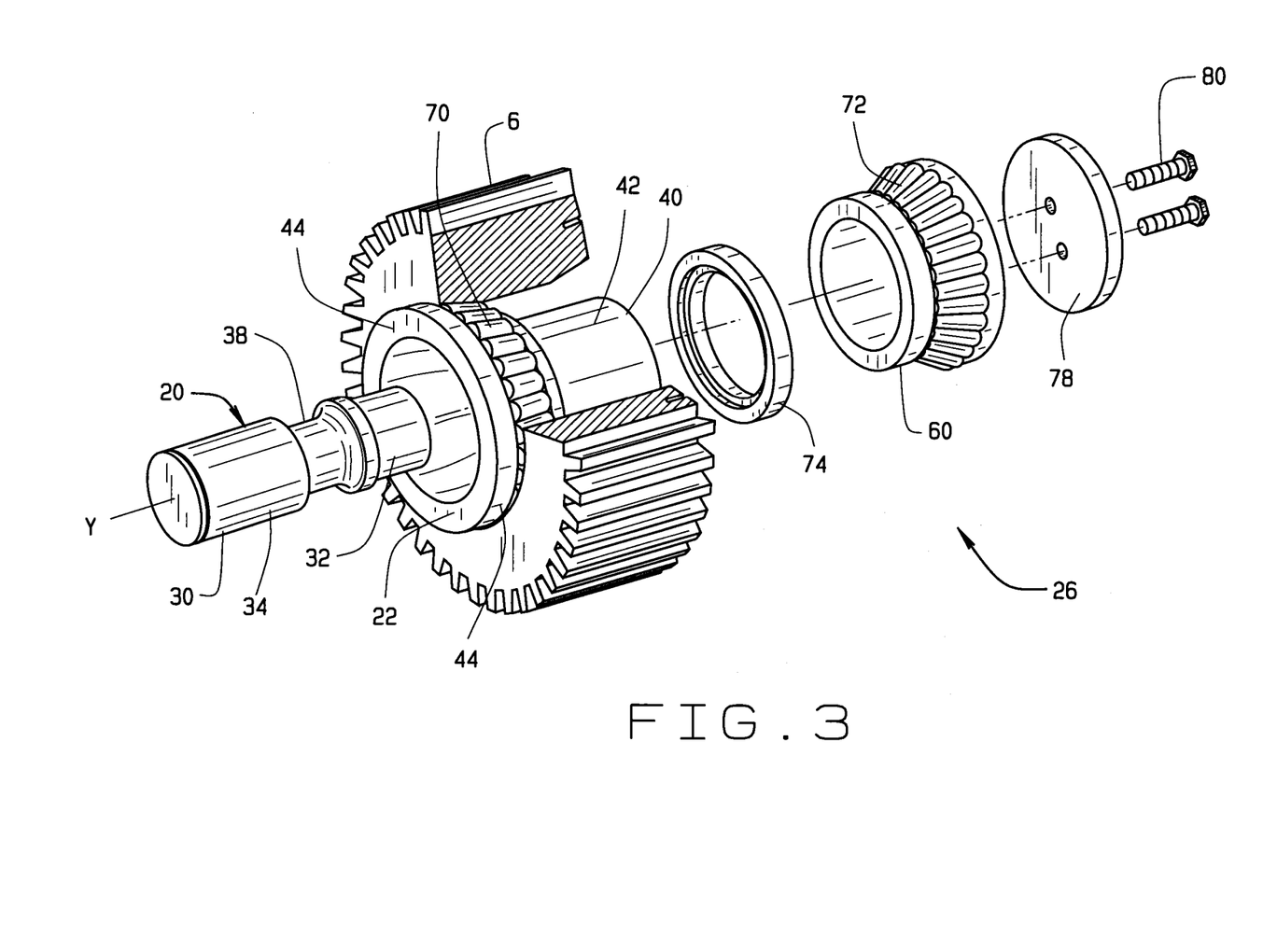
FIG. 3 is an exploded perspective view of one of the flexpin assemblies for the epicyclic gear system.
Figure 4:
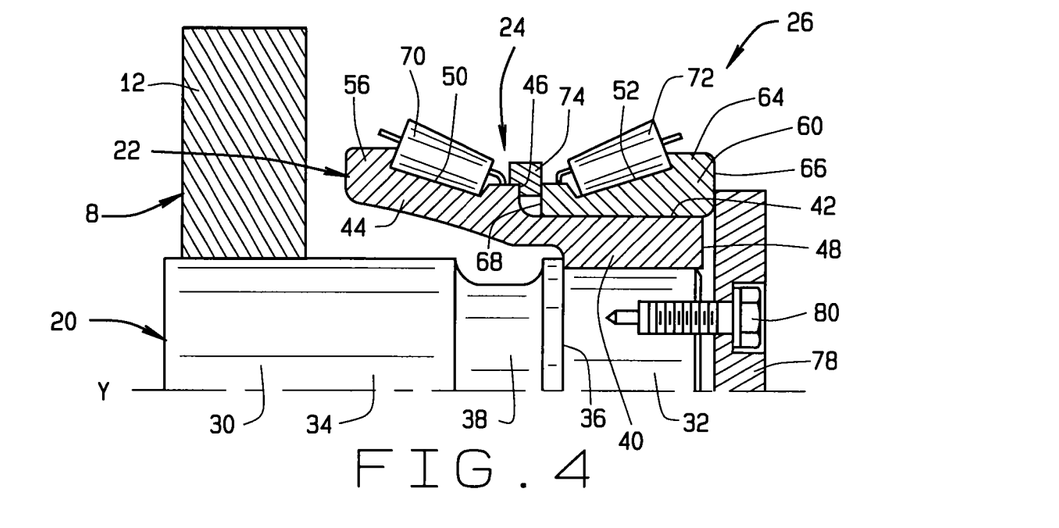
FIG. 4 is a partial sectional view of the flexpin assembly of FIG. 3.

In addition to the wall 12, the carrier 8 has flexpins 20 (FIGS. 2 & 3) that project from and indeed are cantilevered from the end wall 12, one flexpin 20 for each planet pinion 6. Each flexpin 20 at its end remote from the carrier wall 12 is fitted with a sleeve 22 (FIGS. 2-4) that extends back over the flexpin 20 towards the carrier wall 12, yet is spaced radially from flexpin 20 except at the remote end of the flexpin 20 where the sleeve 22 fits firmly and securely around the flexpin 20. In effect, the sleeve 22 is cantilevered from the remote end of the flexpin 20—creating a double cantilever so to speak. The sleeve 22 supports a bearing 24 (FIG. 2), and the bearing 24 in turn supports one of the planet pinions 6. The flexpin 20, the sleeve 22 that it supports, and the bearing 24—or at least a part of it—that enables the pinion 6 to rotate on the sleeve 22, with or without the planet pinion 6, constitute a flexpin assembly 26.

The double cantilever formed by the flexpin 20 and the sleeve 22 that extends back over the flexpin 20 enables the offset axis Y about which the planet pinion 6 rotates to remain parallel to the central axis X. This in turn insures a good mesh between the planet pinion 6 and the sun and ring gears 2 and 4. More specifically, as torque is applied to the carrier wall 12, each flexpin 20 deflects near the wall 12 generally circumferentially along the pitch circle defined by the several axes Y, so that the remote end of the flexpin 20 trails the end that is anchored in the wall 12. The pin 20, however, possesses enough flexibility at its remote end to flex in the opposite direction circumferentially so as to enable the sleeve 22 to remain parallel to the central axis X. Contrast this with a straddle-type carrier with two walls, each pin affixed at both of its ends in the two walls. That type of carrier deforms under the torque transmitted through it, and the pins skew with regard to the central axis of the gear system.

The flexpin 20 for each planet pinion 6 has (FIGS. 2 & 3) a base 30 at which it is fitted to the wall 12 of the carrier 8 and a head 32 at which the sleeve 22 is fitted to the flexpin 20. Between the base 30 and the head 32 the flexpin 20 has a shank 34. The diameter of the shank 34 may exceed that of the head 32, and the two merge at an abutment such as a shoulder 36. The sleeve 22 extends over, yet is spaced radially from, the shank 34. To enhance the flexibility of the flexpin 20, its shank 34 may contain a groove 38 near the shoulder 36.

The flexpin 20 is attached at its base 30 to the carrier wall 12 in any one of several ways. In this regard, the base 30 may have a cylindrical exterior surface (FIG. 2), while the wall 12 opposite each planet pinion 6 has a cylindrical bore, the diameter of which is slightly smaller than the diameter of the surface, at least initially. The base 30 is pressed into the bore so that an interference fit exists between its cylindrical surface and the surface of the bore. In the alternative, the base 30 may have a tapered surface and beyond that surface a thread that projects beyond the carrier wall 12 where it is engaged by a nut as in U.S. Pat. No. 7,056,259, which is incorporated herein by reference. Also, the base 30 may have a flange that is secured to the carrier wall 12 with cap screws as in WO 2007/016336, which is likewise incorporated herein by reference.

The sleeve 22 extends over and is supported on the head 32 of the flexpin 20. Here the sleeve 22 is provided with a mounting section 40 that fits over the head 32 with an interference fit and abuts the shoulder 36. The mounting section 40 has (FIGS. 2 & 3) a cylindrical bearing seat 42 that is presented outwardly away from the axis Y of the flexpin 20. The remainder of the sleeve 22 takes the form of an integrated inner race 44 that extends over the shank 34, yet is spaced outwardly from the shank 34 and terminates short of the carrier wall 12. The mounting section 40 and integrated race 44 merge generally midway between the ends of the sleeve 22, and in this region the sleeve 22 has a shoulder 46. At the opposite end of the mounting section 40, the sleeve 22 has an end face 48 that is perpendicular to the axis Y.

The bearing 24 includes (FIG. 2) tapered outer raceways 50 and 52 that are preferably surfaces on the planet pinion 6 that is supported on the flexpin 20 and its sleeve 22, but in any event are carried by the planet pinion 6. The raceways 50 and 52, which are presented inwardly toward the axis Y of the flexpin 20, taper downwardly toward each other, so as to have their least diameters where they are closest. The integrated race 44, to a measure, forms part of the bearing 24 in that it has a tapered inner raceway 54 and a thrust rib 56 at the large end of the raceway 54. The raceway 54, which is integral to the sleeve 22, is presented outwardly toward the raceway 50 on the pinion 6 and tapers in the same direction. Complementing the integrated inner race 44 and likewise forming part of the bearing 24 is a separate inner race 60 that fits over the bearing seat 42 of the sleeve 22 with an interference fit. It has a tapered raceway 62 that is presented outwardly toward the other outer raceway 52 in the planet pinion 6 and tapers in the same direction as the raceway 52. The race 60 also has a thrust rib 64 at the large end of its raceway 62. The rib 64 extends axially beyond the end of the head 32 on the flexpin 20 and terminates at a back face 66. At its opposite end the race 60 has a front face 68 that is presented toward the shoulder 46 on the sleeve 22. Completing the bearing 24 are tapered rollers 70 organized in a row around the integrated race 44 and more tapered rollers 72 organized in another row around the separate race 60. The rollers 70 contact the outer raceway 50 and the inner raceway 54. Moreover, the rollers 70 are on apex, meaning the conical envelopes in which their tapered side faces lie and likewise the conical envelopes in which the raceways 50 and 54 lie all have their apices at a common point along the axis Y. The rollers 72 contact the outer raceway 52 and inner raceway 62 of the separate race 60 and are likewise on apex.

Figure 2:
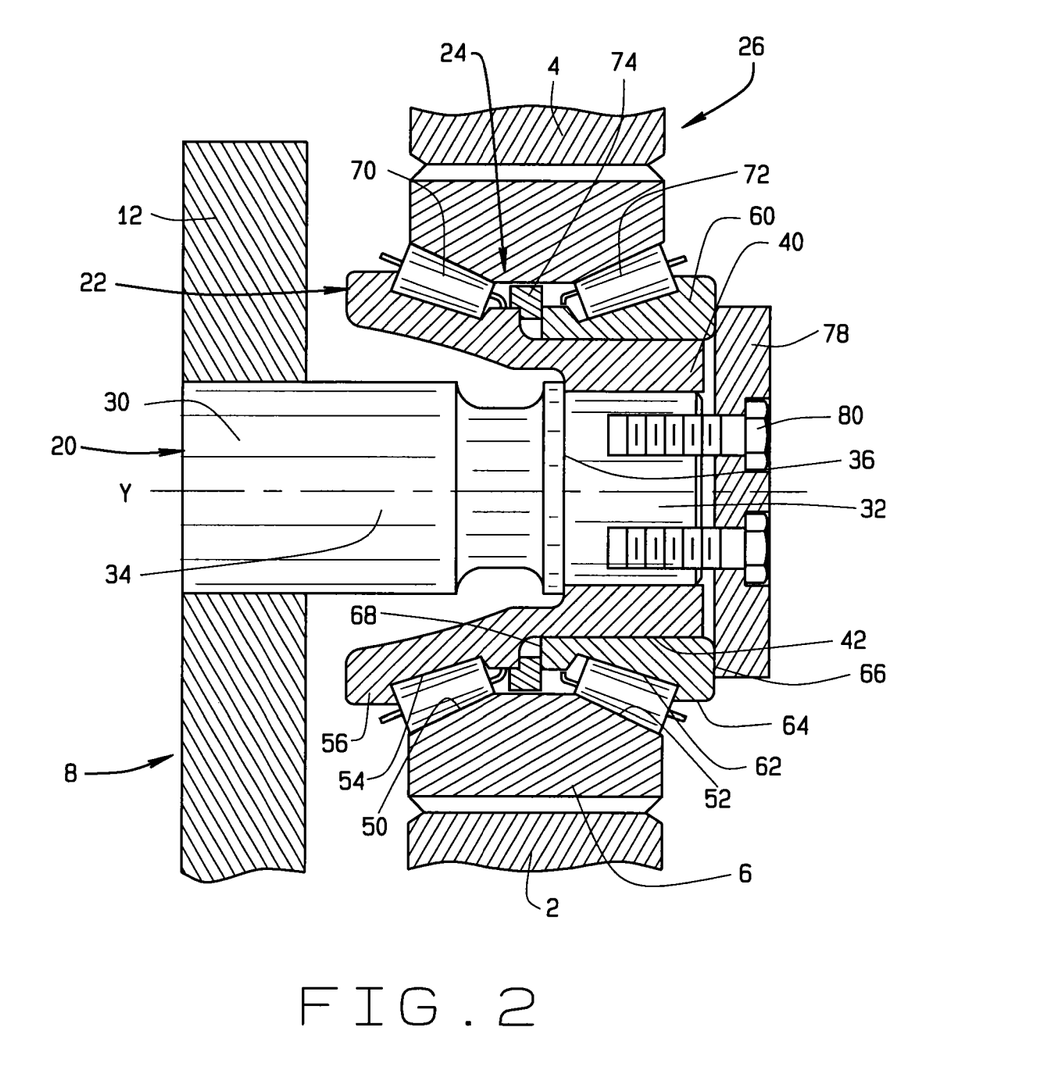
FIG. 2 is sectional view of the epicyclic gear system taken along line 2-2 of FIG. 1.

The bearing 24 should be initially set such that it operates in a condition of light preload, that is to say with no clearances, either axial or radial, between the rollers 70 and their raceways 50 and 54, that they contact and between the rollers 72 and the raceways 52 and 62 that they contact. To achieve the proper setting for the bearing 24, the bearing 24 between the shoulder 46 on the sleeve 22 and the front face 68 of the separate race 60 is fitted with a spacer 74 that establishes a prescribed distance between the inner raceways 54 and 62.

The sleeve 22 and the separate race 60 are captured in a fixed axial position on the flexpin 20 by an end plate 78 (FIG. 2) which covers the end face of the pin 20 and bears against the back face 66 of the separate race 60. Although a slight gap exists between the end face of the flexpin 20 and the plate 78, the plate 78 is held firmly against the back face 66 of the race 60 by cap screws 80 that pass through the plate 78 and thread into the flexpin 20. Actually, the clamping force exerted by the cap screws 80 on the end plate 78 is transmitted through the race 60 to the spacer 74 which in turn transmits the force to the sleeve 22, so that the force likewise holds the mounting section 40 of the sleeve 22 against the shoulder 36 of the flexpin 20.

When the gear system A transmits torque, under most circumstances the planet pinions 6 will rotate between the sun gear 2 and the ring gear 4 with which they are engaged at their teeth. The bearing 24 for each flexpin assembly 26 confines each planet pinion 6 both axially and radially with respect to its sleeve 22 and flexpin 20, yet enables it to rotate with minimal friction about the axis Y for the flexpin assembly 26. The torque, if its magnitude is great enough, will deflect the flexpin 20 where it emerges from the carrier wall 12, with that deflection being circumferentially with respect to the central axis X. But the flexpin 20 flexes in the opposite direction, again circumferentially relative to the axis X, at its groove 38 or otherwise near the mounting section 40. As a consequence, the axis of the sleeve 22, which is the axis Y, remains parallel to the central axis X, and a good mesh exists between the teeth of the planet pinion 6 and the teeth of the sun gear 2 and ring gear 4.

Figure 5:
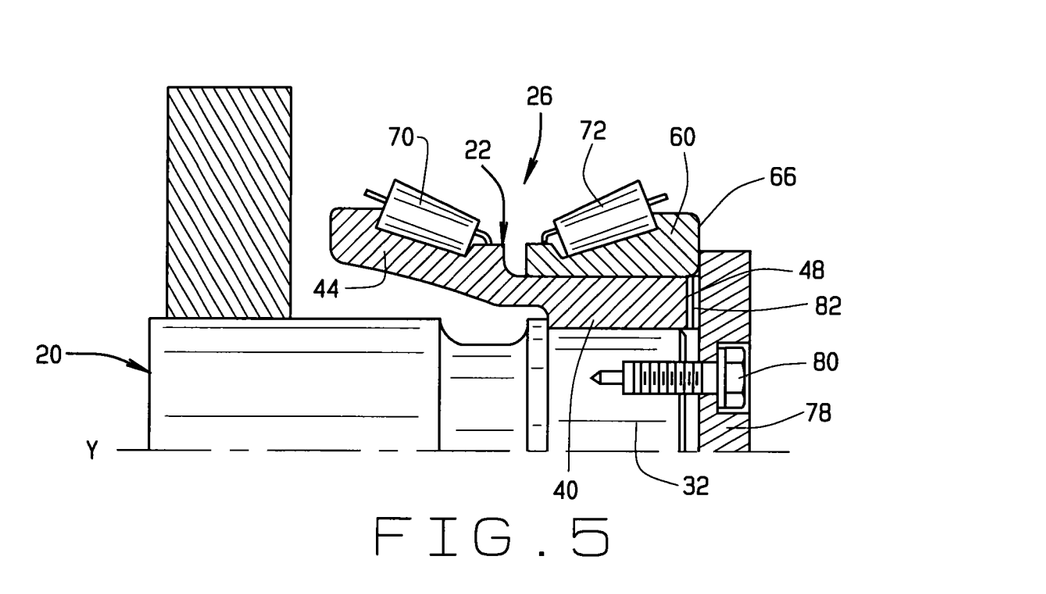
FIG. 5 is a partial sectional view of a variation of the flexpin assembly of FIGS. 3 and 4.

In lieu of controlling the settings of the bearing 24 for each flexpin assembly 26 with a spacer 74, it may be controlled with a shim 82 (FIG. 5) located between the end of the mount 40 for the sleeve 22 and the end plate 78. The force required to maintain the mounting section 40 of the sleeve 22 against the shoulder 36 of the flexpin 20 is again exerted by the cap screws 80, but the shim 82 transmits it from the end plate 78 to the mounting section 40 of the sleeve 22. The thickness of the shim 82 does not affect the force, but it does control the axial position of the separate race 60 and hence the setting for the bearing 24.

An alternative flexpin assembly 86 (FIG. 6) closely resembles the assembly 26. However, its flexpin 20 has a threaded extension 88 formed integral with and projecting axially from its head 32. The extension 88 accommodates a nut 90 which threads over it and bears against the back face 66 of the separate race 60, securing the race 60 on the sleeve 22 and the sleeve 22 on the flexpin 20.

Figures 6, 7:
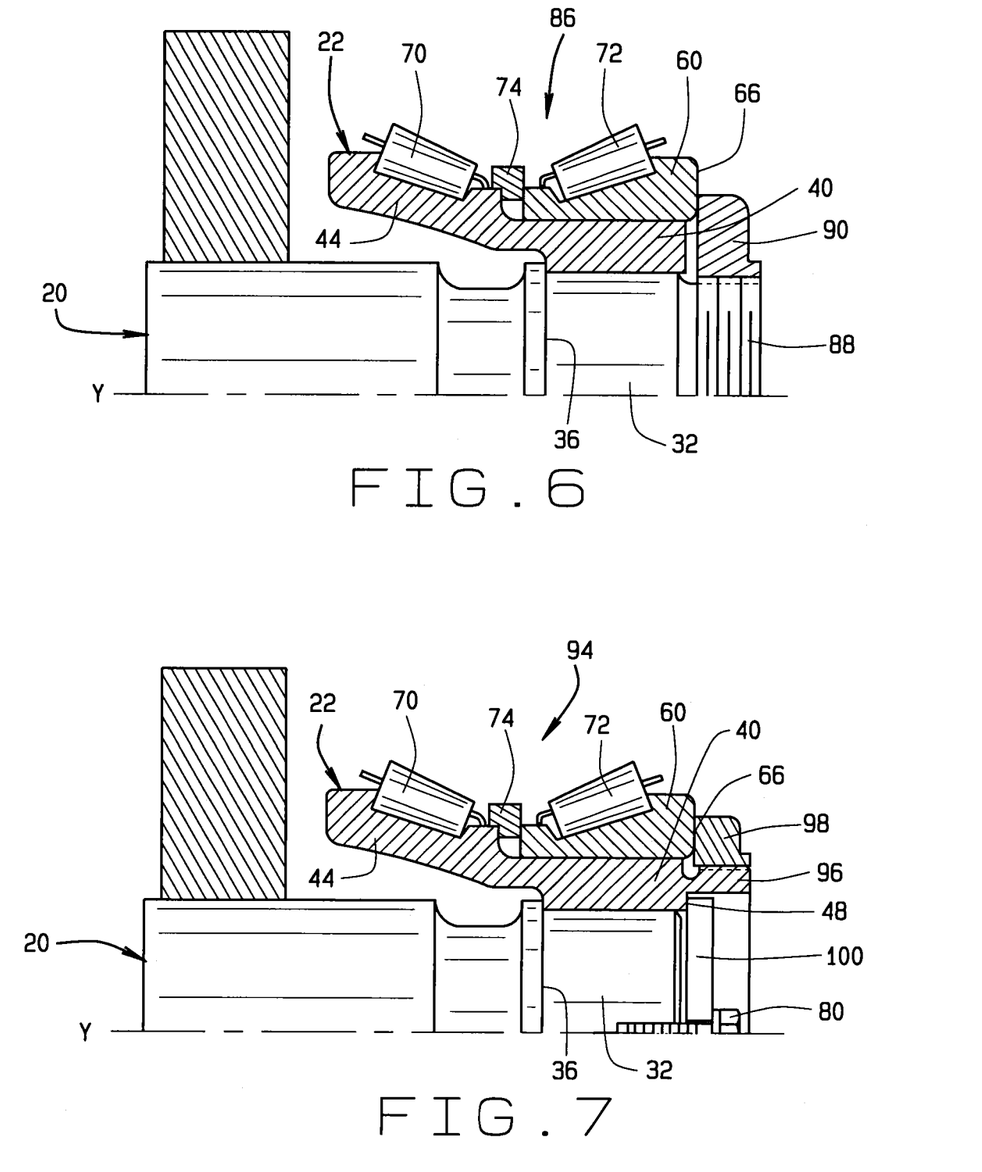
FIG. 6 is a partial sectional view of an alternative flexpin assembly.
FIG. 7 is a partial sectional view of another alternative flexpin assembly.

The alternative flexpin assembly 86 has a spacer 74 that establishes the setting for the bearing 24, but the setting may be controlled with a shim 82 located between the nut 90 and the end face 48 of the mount 40 for the sleeve 22.

Another alternative flexpin assembly 94 (FIG. 7) likewise resembles the flexpin assembly 26, but differs essentially in the configuration of the sleeve 22. That sleeve 22 has an annular rib 96 projecting from its end face 48, leaving the end face 48 with a lesser area located immediately outwardly from the end of the head 32 on the flexpin 20. The rib 96 has an external thread that is engaged by a nut 98 that is turned down against the back face 66 of the separate race 60. The modified sleeve 22 is secured to the head 32 of the flexpin 20 by an end plate 100 which in turn is secured to the flexpin 20 with cap screws 80. The force exerted on the plate 100 by the screws 80 is transmitted to the mounting section 40 of the sleeve 22 at the end face 48 of the sleeve 22 and serves to clamp the mounting section 40 between the shoulder 36 of the flexpin 20 and the plate 100.

The setting for the bearing 24 of the alternative flexpin assembly 94 may be established with a spacer 74, in which event the separate race 60 is clamped between spacer 74 and the nut 98. Or the spacer 74 may be eliminated and the setting controlled by advancing the nut 98 until the position of the race 60 on the bearing seat 42 provides the bearing 24 with the desired setting.

Any one of the flexpin assemblies 26, 86, 94, may be disassembled for service without removing its pin 20 from the carrier wall 12. Moreover, the setting for its bearing 24 is controlled by the position of the separate race 60 on the bearing seat 42 of the sleeve 22, and varying the axial position of the race 24 is a relatively simple procedure. Certainly, it is less complicated than the procedure required for a fully integrated flexpin assembly in which both inner raceways form surfaces of the sleeve and the sleeve has a separate rib ring. The ease with which the flexpin assemblies 26, 86 and 94 may be disassembled and the ease with which their bearings 24 may be adjusted make the assemblies 26, 86 and 94 well suited for tear down and bearing adjustment without taking the gear systems A of which they are part out of service for sustained periods. Indeed, adjustment is achieved simply by changing the size of the spacer 74 or shim 84 for the bearing 24 or otherwise changing the position of the separate race 60 on the bearing seat 42.

The bearing 24 need not be a tapered roller bearing. It could take the form of some other type of bearing having one raceway on a race integrated into the sleeve 22 and another separate race located on a bearing seat 42 provided by the sleeve 22. The bearing 24 may be an angular contact ball bearing organized in two rows, a spherical roller bearing, or even a cylindrical roller bearing with rollers in one or multiple rows. The outer raceways 50 and 52 may be on separate outer races or on a single outer race fitted into the planet pinion 6 or where the bearing 24 takes some other form they may be on a separate race or races appropriate for that type of bearing. The end plate 78 or 100, where present, may be secured with a threaded stud projected axially from the head 32 of the flexpin 20 and a nut threaded over the stud. The end member of the carrier 8 need not take the form of a wall, but may be some other configuration that is suitable for a carrier, such as a spider-shape. Furthermore, the sun gear 2 and ring gear 4 as well as the pinions 6 may have helical teeth, in which event a deflection inhibitor may be provided on the sleeve 22 or between the sleeve 22 and the pin 20 to prevent the sleeve 22 from deflecting radially with respect to the central axis X under the coupled created by the helical teeth when torque is transmitted, all as set forth in WO 2009/152306, which is incorporated herein by reference. Be that as it may, the sleeve 22 is still essentially spaced from the pin 20 remote from the head 32 on the pin 20.

The invention claimed is:

1. A flexpin assembly for an epicyclic gear system, said flexpin assembly having an axis and comprising:
   a flexpin having a base and a head remote from the base;
   a sleeve located around the flexpin and attached firmly to the flexpin at the head of the flexpin, but otherwise being essentially spaced radially from the flexpin, the sleeve having an integral race provided with an inner raceway that is presented outwardly away from the axis and a bearing seat next to the integral race;
   an initially separate race on the bearing seat of the sleeve and having an inner raceway that is also presented outwardly, away from the axis;
   rolling elements arranged along the inner raceways.

2. The flexpin assembly according to claim 1 wherein the sleeve fits over the head of the flexpin.

3. The flexpin assembly according to claim 2 wherein the flexpin has an abutment at its head, and the sleeve has a mounting section that fits over the head and against the abutment; and further comprising means for urging the mounting section against the abutment.

4. The flexpin assembly according to claim 3 wherein the bearing seat is on the mounting section.

5. The flexpin assembly according to claim 3 wherein the mounting section has an end face that is presented axially away from the abutment; and wherein the means for urging the mounting section against the abutment includes a plate that is located opposite the end face of the mounting section.

6. The flexpin assembly according to claim 5 wherein the plate exerts an axially directed force on the mounting section of the sleeve.

7. The flexpin assembly according to claim 6 wherein the separate race has a back face, and the plate bears against the back face.

8. The flexpin assembly according to claim 7 wherein the plate exerts an axially directed force on the separate race, and that force is transmitted through the separate race to the sleeve and urges the mounting section of the sleeve against the abutment on the flexpin.

9. The flexpin assembly according to claim 6 wherein the sleeve has a threaded rib that projects axially from its mounting section; and
wherein a nut threads over the rib and serves to position the separate race axially on the bearing seat of the mounting section.

10. The flexpin assembly according to claim 3 wherein the means for urging the mounting section against the abutment comprises a threaded extension projecting axially from the head of the flexpin and a nut threaded over the extension and located opposite the separate race and the mounting section of the sleeve.

11. The flexpin assembly according to claim 3 and further comprising a planet pinion located around the sleeve and carrying outer raceways that are presented opposite the inner raceways and contact the rolling elements, the outer raceway, the integral race, the initially separate race and the rolling elements forming a bearing.

12. A process for removing the planet pinion of the flexpin assembly of claim 11, said process comprising removing the initially separate race from the bearing seat of the sleeve and disassembling the bearing, all while the flexpin remains secured to an end member of a carrier.

13. An epicyclic gear system comprising:
a sun gear;
a ring gear surrounding the sun gear;
a carrier including an end member and flexpin assemblies according to claim 11, the planet pinions of the flexpin assemblies being located between and being engaged with the sun and ring gears, the flexpins of the flexpin assemblies being fitted to the end member.

14. A flexpin assembly for an epicyclic gear system; said flexpin assembly having an axis and comprising:
a flexpin having a base, a head, and a shank between the base and the head;
a sleeve located around the flexpin and having a mounting section at which it is attached firmly to the head of the flexpin, yet can be removed from the flexpin; the sleeve on its mounting section having a bearing seat and around the shank having a first inner raceway, with both the bearing seat and the first inner raceway being presented away from the axis; and
an initially separate inner bearing race on the bearing seat of the sleeve and having a second inner raceway that is presented outwardly away from the axis.

15. The flexpin assembly according to claim 14 wherein the flexpin has a shoulder at the end of the head and the mounting section of the sleeve is against the shoulder.

16. The flexpin assembly according to claim 15 and further comprising means for urging the mounting section of the sleeve against the shoulder on the flexpin.

17. The flexpin assembly according to claim 14 wherein the first and second raceways are inclined in opposite directions with respect to the axis.

18. The flexpin assembly according to claim 14 and further comprising:
a planet pinion;
first and second outer raceways carried by the planet pinion and presented toward the first and second inner raceways, respectively;
first rolling elements arranged in a row between the first raceways;
second rolling elements arranged in a row between the second raceways.

19. An epicyclic gear system comprising;
a sun gear;
a ring gear located around the sun gear; and
a carrier including an end member and flexpin assemblies constructed in accordance with claim 18, the planet pinions of the flexpin assemblies being located between and engaged with the sun and ring gears, the flexpins of the flexpin assemblies at their bases being secured to the end member.

20. A process for rendering more serviceable a flexpin that defines an axis and includes a flexpin, a sleeve, and a bearing for supporting a planet pinion, said process comprising:
securing the sleeve to one end of the flexpin such that the sleeve extends back over the flexpin and is spaced from the flexpin except at where it is secured, with the securement being such that the sleeve can be withdrawn axially from the flexpin;
providing the sleeve with an integral bearing race for the bearing; providing the sleeve with a bearing seat; and
installing a separate bearing race for the bearing over the bearing seat such that the separate race can be withdrawn axially from the bearing seat.

* * * * *

UNITED STATES PATENT AND TRADEMARK OFFICE
CERTIFICATE OF CORRECTION

| | | |
|---|---|---|
| PATENT NO. | : 8,920,284 B2 | Page 1 of 1 |
| APPLICATION NO. | : 13/265769 | |
| DATED | : December 30, 2014 | |
| INVENTOR(S) | : Gerald P. Fox | |

It is certified that error appears in the above-identified patent and that said Letters Patent is hereby corrected as shown below:

Title page, Col. 2, line 13 of item (57) Abstract, replace "h an" with --has an--

Signed and Sealed this
Twenty-first Day of April, 2015

Michelle K. Lee
*Director of the United States Patent and Trademark Office*